United States Patent
Blendermann et al.

(10) Patent No.: US 6,925,525 B2
(45) Date of Patent: Aug. 2, 2005

(54) DATA STORAGE MANAGEMENT SYSTEM AND METHOD

(75) Inventors: Stephen H. Blendermann, Boulder, CO (US); Alan Ray Sutton, Boulder, CO (US); Robert Raicer, Longmont, CO (US); L. Michael Anderson, Arvada, CO (US); Clayton E. Ruff, Longmont, CO (US); William G. Kefauver, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 10/255,890

(22) Filed: Sep. 26, 2002

(65) Prior Publication Data

US 2003/0028718 A1 Feb. 6, 2003

Related U.S. Application Data

(63) Continuation of application No. 09/121,254, filed on Jul. 23, 1998, now Pat. No. 6,789,161, which is a continuation-in-part of application No. 09/110,217, filed on Jul. 6, 1998, now Pat. No. 6,094,605.

(51) Int. Cl.⁷ .............................................. G06F 12/00
(52) U.S. Cl. ........................... 711/111; 711/112; 710/52
(58) Field of Search ......................... 711/111–113, 131, 711/143; 710/52, 54

(56) References Cited

U.S. PATENT DOCUMENTS

| | | | |
|---|---|---|---|
| 3,130,387 A | 4/1964 | Wright et al. | |
| 3,292,153 A | 12/1966 | Barton et al. | |
| 3,699,533 A | 10/1972 | Hunter | |
| 3,806,888 A | 4/1974 | Brickman et al. | |
| 3,909,799 A | 9/1975 | Recks et al. | |

(Continued)

FOREIGN PATENT DOCUMENTS

| | | |
|---|---|---|
| CA | 892798 | 2/1972 |
| GB | 1167762 | 10/1966 |
| GB | 1359662 | 7/1971 |
| GB | 1353770 | 9/1971 |
| GB | 1496779 | 12/1974 |
| GB | 1547381 | 3/1976 |
| GB | 2 063 532 B | 9/1980 |
| JP | 51-18409 | 2/1976 |
| JP | 52-106641 | 9/1977 |
| JP | 53-22331 | 3/1978 |
| JP | 53-84632 | 7/1978 |
| JP | 53-98741 | 8/1978 |
| JP | 108747 | 9/1978 |
| JP | 55-153058 | 11/1980 |
| JP | 55-164958 | 12/1980 |
| JP | 4-48250 | 8/1992 |

OTHER PUBLICATIONS

USPTO—In re application of U.S. Appl. No.: 08/934,732, filed: Sep. 22, 1997 For: Virtual Storage System and Method—Information Disclosure Statement and PTO Form 1449 accompanying Protest of Reissue Application Under 37 CFR §1.291, dated Jul. 19, 1999.

(Continued)

*Primary Examiner*—Matthew Kim
*Assistant Examiner*—Woo H. Choi
(74) *Attorney, Agent, or Firm*—Brooks Kushman P.C.

(57) ABSTRACT

The present invention provides a virtual automated cartridge system (ACS) and data storage device management method which incorporates a temporary data buffer arrangement between multiple user systems and conventional physical data storage devices. The temporary data buffer arrangement emulates a compatible physical data storage device when accessed by each of the user systems, but allows simultaneous allocation of different users to access to read and write data to the temporary data buffer. A control processor automatically transfers data stored in the temporary data buffer arrangement to one of the physical data storage devices when allocation to a user has ended.

10 Claims, 3 Drawing Sheets

U.S. PATENT DOCUMENTS

| | | |
|---|---|---|
| 3,928,857 A | 12/1975 | Carter et al. |
| 3,936,804 A | 2/1976 | Bachman |
| 3,949,377 A | 4/1976 | ONeill, Jr. |
| 3,949,379 A | 4/1976 | Ball |
| 3,976,977 A | 8/1976 | Porter et al. |
| 4,021,782 A | 5/1977 | Hoerning |
| 4,035,778 A | 7/1977 | Ghanem |
| 4,040,026 A | 8/1977 | Gernelle |
| 4,054,951 A | 10/1977 | Jackson et al. |
| 4,077,059 A | 2/1978 | Cordi et al. |
| 4,080,651 A | 3/1978 | Cronshaw et al. |
| 4,080,652 A | 3/1978 | Cronshaw et al. |
| 4,084,228 A | 4/1978 | Dufond et al. |
| 4,084,234 A | 4/1978 | Calle et al. |
| 4,086,629 A | 4/1978 | Desyllas et al. |
| 4,091,455 A | 5/1978 | Woods et al. |
| 4,096,567 A | 6/1978 | Millard et al. |
| 4,110,823 A | 8/1978 | Cronshaw et al. |
| 4,123,795 A | 10/1978 | Dean, Jr. et al. |
| 4,126,894 A | 11/1978 | Cronshaw et al. |
| 4,158,235 A | 6/1979 | Call et al. |
| 4,189,770 A | 2/1980 | Gannon et al. |
| 4,215,400 A | 7/1980 | Denko |
| 4,228,501 A | 10/1980 | Frissell |
| 4,241,420 A | 12/1980 | Fish et al. |
| 4,246,637 A | 1/1981 | Brown et al. |
| 4,276,595 A | 6/1981 | Brereton et al. |
| 4,298,932 A | 11/1981 | Sams |
| 4,310,883 A | 1/1982 | Clifton et al. |
| 4,318,184 A | 3/1982 | Millett et al. |
| 4,327,408 A | 4/1982 | Frissell et al. |
| 4,412,285 A | 10/1983 | Neches et al. |
| 4,414,644 A | 11/1983 | Tayler |
| 4,467,421 A | 8/1984 | White ......................... 711/118 |
| 4,533,995 A | 8/1985 | Christian et al. |
| 4,792,898 A | 12/1988 | McCarthy et al. ........... 711/111 |
| 5,164,909 A | 11/1992 | Leonhardt et al. ........... 700/215 |
| 5,228,135 A * | 7/1993 | Ikumi ........................... 711/131 |
| 5,247,649 A * | 9/1993 | Bandoh ........................ 711/131 |
| 5,287,459 A | 2/1994 | Gneiwek ...................... 711/111 |
| 5,317,728 A | 5/1994 | Tevis et al. .................. 707/204 |
| 5,327,535 A * | 7/1994 | Ogata et al. ................. 711/113 |
| 5,359,723 A * | 10/1994 | Mathews et al. ............ 711/143 |
| 5,369,753 A * | 11/1994 | Tipley .......................... 711/122 |
| 5,388,260 A | 2/1995 | Monahan et al. ............... 711/1 |
| 5,455,926 A | 10/1995 | Keele et al. .................. 711/112 |
| 5,548,724 A | 8/1996 | Akizawa et al. ............. 711/111 |
| 5,557,768 A * | 9/1996 | Braceras et al. ............. 711/131 |
| 5,566,315 A * | 10/1996 | Milillo et al. ................. 711/113 |
| 5,613,155 A * | 3/1997 | Baldiga et al. .................. 710/5 |
| 5,623,669 A | 4/1997 | Kincaid ........................ 707/205 |
| 5,742,789 A | 4/1998 | Ofer et al. .................... 711/111 |
| 5,752,268 A | 5/1998 | Shimizu et al. .............. 711/111 |
| 5,805,538 A | 9/1998 | Kamada et al. .............. 711/111 |
| 5,805,864 A | 9/1998 | Carlson et al. ............... 711/114 |
| 5,829,046 A * | 10/1998 | Tzelnic et al. ............... 711/162 |
| 5,926,649 A | 7/1999 | Ma et al. ...................... 711/111 |
| 5,926,834 A * | 7/1999 | Carlson et al. ............... 711/152 |
| 5,953,350 A | 9/1999 | Higgins ........................ 370/524 |
| 5,960,451 A | 9/1999 | Voigt et al. ................... 711/114 |
| 6,049,848 A | 4/2000 | Yates et al. |
| 6,052,765 A | 4/2000 | Blendermann et al. |
| 6,067,587 A * | 5/2000 | Miller et al. .................. 710/20 |
| 6,094,605 A * | 7/2000 | Blendermann et al. ..... 711/111 |
| 6,138,221 A * | 10/2000 | Korst et al. ................... 711/112 |
| 6,151,666 A | 11/2000 | Blendermann et al. |
| RE36,989 E | 12/2000 | White |
| 6,269,464 B1 | 7/2001 | Boussina et al. |
| 6,289,425 B1 * | 9/2001 | Blendermann et al. ..... 711/170 |
| 6,298,386 B1 * | 10/2001 | Vahalia et al. ............... 709/234 |
| 6,317,814 B1 * | 11/2001 | Blendermann et al. ..... 711/162 |
| 6,324,497 B1 | 11/2001 | Yates et al. |
| 6,330,621 B1 | 12/2001 | Bakke et al. |
| 6,789,161 B1 | 9/2004 | Blendermann et al. |

OTHER PUBLICATIONS

USPTO—In re U.S. Appl. No.: 08/934,732, Filed: Sep. 22, 1997 For: Virtual Storage System and Method—Protest of Reissue Application Under 37 CFR §1.291 (with attached exhibits), dated Jul. 19, 1999.

*Sutmyn Storage Corporation, et al.* v. *Storage Technology Corporation* and *Storage Technology Corporation* v. *Sutmyn Storage Distribution Co.*, C97–20105 RMW, C97 20629 RMW. Plaintiffs' Notice Pursuant To 35 U.S.C. § 282, dated Jan. 5, 2001.

*Sutmyn Storage Corporation, et al.* v. *Storage Technology Corporation* and *Storage Technology Corporation* v. *Sutmyn Storage Distribution Co.*, C97–20105 RMW, C97 20629 RMW, Findings of Fact and Conclusion of Law, dated Mar. 18, 2003.

Boggs, J.K. Jr., "Virtual Input/Output Channels for a Digital Computer," IBM Technical Disclosure Bulletin, vol. 20; No. 1, Jun. 1977, pp. 110–112.

Conti, C.J.; et all., "Structural aspects of the System/360 Model 85: General organization", IBM Systems Journal, vol. 7, No. 1, pp. 2–14, 1968.

Crittenden, Willard C., "Operational Characteristics of the NCAR Mass Storage Device," IEEE Computer, pp. 48–50, Aug. 1980.

IBM, "Reference manual for IBM 3830 Storage Control Model 1 and IBM 3330 Disk Storage", GA–26–1592–5, $6^{th}$ Ed., Nov. 1976 ((c) 1971).

Masstor, Shell Oil Proposal, Dec. 18, 1978.

Nishimukai, T. et al., "Universal IO Device Controller by Using Programmable Logic Arrays (PLA)", Conference Record, $11^{th}$ Asilomar Conference on Circuits, Systems and Computers, Nov. 1977, pp. 477–480.

Porter, James N., "The Disk Drive Industry", IEEE Transaction on Magnetics, vol. MAG–14, No. 4, Jul. 1978, pp. 149–153.

Puthuff, Steven H., "Technical Innovations in Information Storage and Retrieval", IEEE Transactions on Magnetics, vol. MAG–14, No. 4, Jul. 1978, pp. 143–148.

Smith, Alan Jay, "Directions for Memory Hierarchies and their Components: Research and Development", 1978 IEEE, pp. 704–709.

Waddell, J.M., Way, D.L., "Channel Scheduling by a Control Unit", IBM Technical Disclosure Bulletin, vol. 17, No. 9, Feb. 1975, pp. 2553–2556.

* cited by examiner

DATA STORAGE MANAGEMENT SYSTEM AND METHOD

CROSS-REFERENCE TO RELATED APPLICATIONS

This application is a continuation of U.S. application Ser. No. 09/121,254 filed Jul. 23, 1998, now U.S. Pat. No. 6,789,161, which is a continuation-in-part of U.S. application Ser. No. 09/110,217 filed Jul. 6, 1998, now U.S. Pat. No. 6,094,605.

TECHNICAL FIELD

The present invention relates generally to a data storage arrangement.

BACKGROUND ART

Generally, automated cartridge systems (ACS) provide a mechanism by which multiple users in a data processing system can have common access to multiple data storage subsystems such as magnetic tape cartridge devices. In conventional tape systems, data files generated by remote user computer systems for storage on a particular tape cartridge include a predetermined expiration date in the file meta data which is used as a control mechanism by which a tape management subsystem can determine whether a particular space on a tape can be rewritten with new data. However, in conventional tape systems, expired data from a "scratched" tape volume is not actually deleted from the tape until a user actually writes new data to the tape. In other words, conventional tape systems conveniently provide a "safety net" for users who decide they still wish to be able to retrieve data from storage even though the data may be past the original expiration date.

Because conventional tape systems have proven to be quite inefficient in data storage space utilization, a virtual tape system has been developed which significantly improves storage space utilization and control by incorporating the advantages of an intermediate disk buffer as part of a tape emulation arrangement. Such an arrangement is taught in commonly owned copending U.S. patent application Ser. No. 09/110,217 filed on Jul. 6, 1998, now U.S. Pat. No. 6,094,605, and incorporated by reference herein.

More specifically, in the referenced virtual tape system, a disk buffer is connected between remote users and the tape storage devices and arranged to appear to users as though it were a physical tape device. All data volumes are initially stored in the disk buffer, and subsequently written to a physical tape device using predetermined protocols which limit the occurrence of unusable dead spaces on the tapes while also improving the ability to reclaim any fragmented space which does occur. In such a virtual tape system, a user reads and writes only to the disk buffer, but believes they are reading and writing to an actual physical tape device.

While efficiency in space management and utilization are significantly improved with the virtual tape system, users also lose the above-noted safety net feature inherently provided by conventional tape systems. More specifically, to achieve higher efficiency, the virtual tape system operates to automatically reutilize any tape and disk buffer space occupied by expired data without user action, i.e., a user does not have exclusive monopoly of a particular tape like in a conventional tape system because the tape can be reused any time a new data volume is received into the disk buffer. Emulating the safety net feature in the virtual tape system would involve prohibiting the reuse of any tape space until a user reuses a corresponding virtual tape volume name for the data volume stored in the space irrespective of whether the corresponding data has expired.

However, such an arrangement reintroduces significant inefficiency in storage space utilization and reclamation, thereby defeating a main advantage of the virtual tape system. As a result, a need exists for an improved method of controlling reutilization of data space in a virtual tape system which can provide a safety net for users while also minimizing the impact of such a feature on efficiency of data storage space utilization and management.

Generally, conventional automated cartridge systems (ACS) allow multiple users in a data processing system common access to multiple data storage subsystems. However, due to the operational nature of the data storage subsystems, conventional ACS arrangements can only provide such common access via a serial access data control.

More specifically, whenever a user is performing a task which may require need of a storage/tape device, the user sends a request to a host computer control system. Upon receipt of such a request, the operating system must grab the storage device and allocate the device to the requesting user for the duration of the entire task irrespective of the amount of use actually made by the user.

Because such user monopolization denies allocation requests from other users while a resource is already allocated, storage device allocation and use in conventional ACS arrangements is highly inefficient. This in turn significantly lowers throughput capability of systems which may otherwise be capable of high speed processing.

DISCLOSURE OF THE INVENTION

Figure 1:
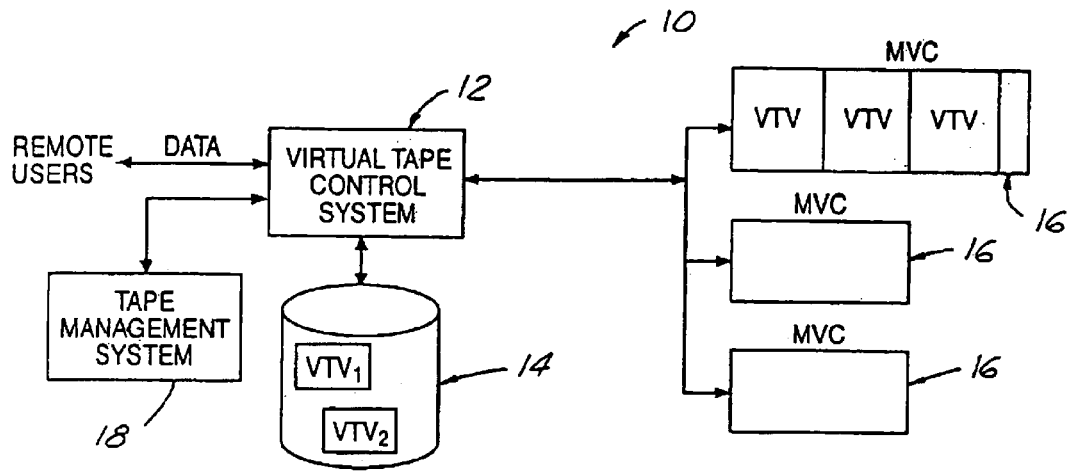
FIG. 1 is a block diagram illustrating a virtual tape system utilizing selective deletion of data corresponding to a scratched virtual volume.

It is therefore an object of the present invention to provide an improved ACS and data storage device management method which does not require user monopolization of a storage device when allocating the device to a user.

It is another object of the present invention to provide an ACS and data storage device management method which provides an intermediary subsystem arranged to automatically emulate a storage device when allocated to a user, wherein the intermediary subsystem is arranged to allow multiple simultaneous user access/allocation of data storage capability.

It is still another object of the present invention to provide a virtual ACS and data storage device management method which operates as a temporary storage device while giving the appearance of a conventional "physical" storage device in an ACS to a requesting user.

It is still another object of the present invention to provide an ACS and data storage device management method which provides an intermediary subsystem arranged to automatically emulate a compatible storage device when allocated to a user, thereby allowing any type or format of physical storage to be used in conjunction with remote computer systems irrespective of compatibility.

In accordance with these and other objects, the present invention provides a virtual ACS and data storage device management method which incorporates a temporary data buffer arrangement between multiple user systems and any type of conventional physical data storage devices, wherein the temporary data buffer arrangement is arranged to emulate a physical data storage device when accessed by each of the user systems, while also allowing multiple users simultaneous access to read and write data to the temporary data buffer. The system includes a control processor arranged to periodically transfer any data in the temporary data buffer arrangement to one of the physical data storage devices.

In accordance with one aspect of the present invention, a virtual automated cartridge system is provided including a data storage manager having a first input/output connected to at least one remote user computer system, and a second input/output connected to at least one physical data storage device, and an interim data storage device connected to the data storage manager and arranged to emulate a physical data storage with respect to storing or retrieving data for the at least one remote user computer system. The data storage manager includes a processor operative to assign a portion of the interim data storage device to a user computer system upon receipt of a user request for allocation of a data storage device for a duration of time.

In accordance with another aspect of the present invention, a method for efficiently managing allocation of at least one physical data storage device in an automated cartridge system to competing remote user computer systems includes providing an interim data storage device which is arranged to emulate a physical data storage with respect to storing or retrieving data for a remote user computer system, and assigning a first portion of the interim data storage device in lieu of the at least one physical data storage device upon receiving a request from a remote user computer system for allocation of a data storage device for a duration of time.

These and other objects, features, and advantages of the present invention will be readily apparent from the following detailed description of the best mode for carrying out the invention when taken in connection with the accompanying drawings.

A virtual tape system 10 includes a virtual tape control system 12 having a suitable control processor (not shown) for routing all data volume files received from remote users to a disk buffer 14. Virtual tape control system 12 is arranged to transfer data from disk buffer 14 to one or more multiple volume cartridges (MVC) 16 as virtual tape volumes (VTV). A map matching the MVC location with corresponding VTV names and all corresponding file meta data is maintained by the virtual tape control system 12. An external tape management system (TMS) 18 provides overall management of the use of virtual tapes used by virtual tape system 10.

Users can selectively tag or encode any desired data volume file to indicate that the tape and/or disk buffer space occupied by the corresponding virtual volume can be automatically reused either immediately after the expiration date or a predetermined period of time after the expiration date. i.e., a data deletion "grace period." Otherwise, if the user does not expressly designate a data volume file, virtual tape control system 12 will be prohibited from deleting and reusing the space of an expired virtual volume until a user reuses the VTV name for a new file of data.

Figure 2:
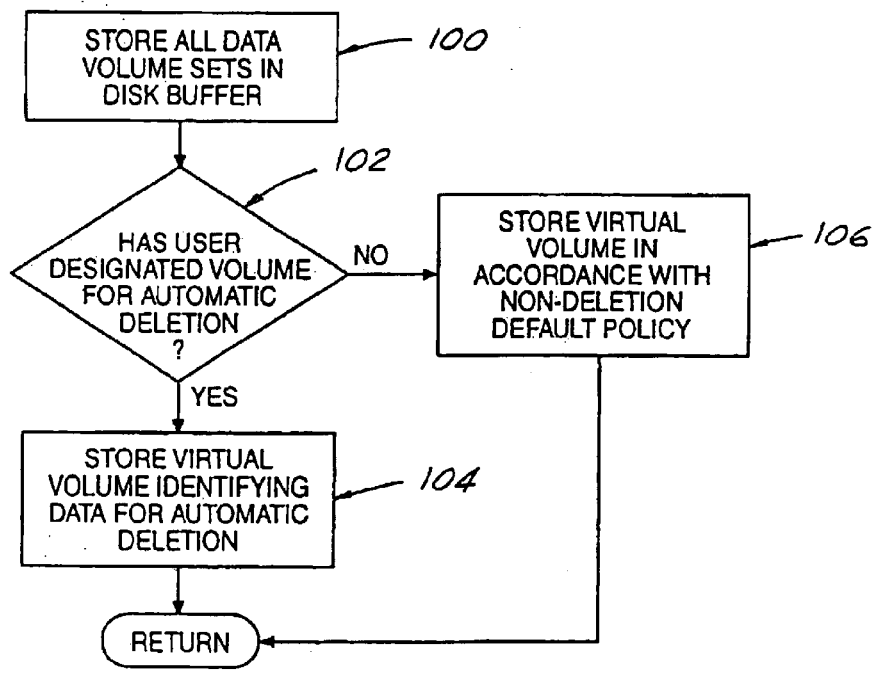
FIG. 2 is a flowchart showing the overall process.
Figure 3:
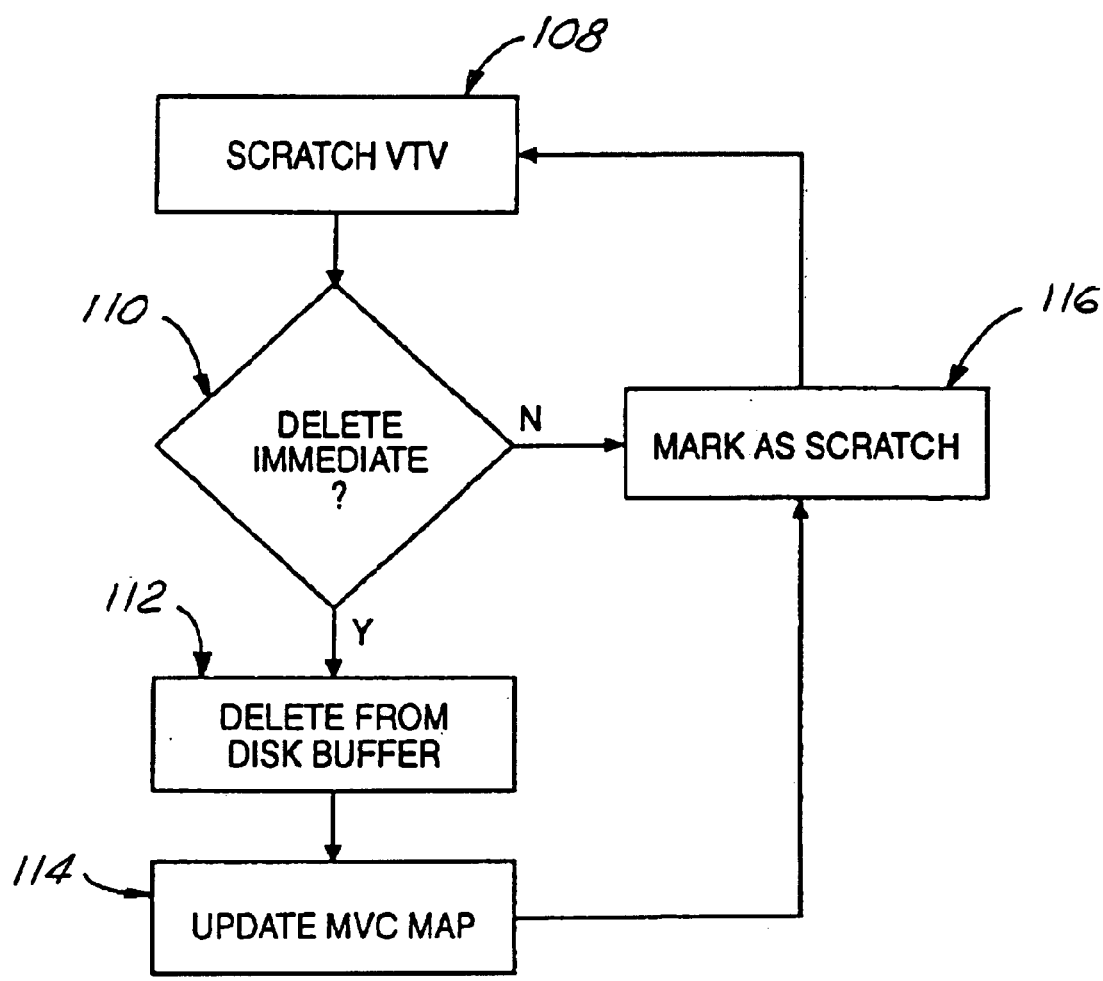
FIG. 3 is a flowchart showing verification and deletion of designated data from a scratch virtual volume.

This process is summarized in the flow charts of FIGS. 2 and 3. As denoted at block 100, all data volume files are stored in the disk buffer, and analyzed at block 102 to determine whether or not the user has designated the corresponding data for immediate deletion at the expiration date, or alternatively after a predetermined or user defined grace period. At block 104, if the data has been designated, the appropriate identifying and mapping information are marked to indicate that the corresponding data can be immediately deleted at either the expiration date or the end of the predetermined grace period. Otherwise, at block 106 the virtual volume is stored in accordance with a default policy which will not allow the virtual tape control system to reuse the tape and disk space occupied by the virtual volume after scratching until that particular virtual volume name is actually reused by the user.

The flowchart of FIG. 3 illustrates an example of automatic deletion of data from a scratch VTV. A VTV which has been selected for scratch at block 108 is analyzed at block to determine whether the VTV has been designated for automatic deletion. If automatic deletion has been identified, the data is deleted from the disk buffer at block 112 (if the data is disk buffer resident), and the MVC map is updated at block 114 to reflect the deletion of the data from the VTV and the space on the physical tape occupied by the virtual volume can be reused. After updating of the MVC map, or if the data had not been identified for automatic deletion at block 110, the virtual volume is marked as scratch at block 116 and therefore reusable. However, the VTV marked for scratch will still contain the data until the VTV is actually reused if the data was not deleted at block 112 or the MVC map Was not updated at block 114.

While described as requiring the user to designate whether the data can be automatically deleted to allow bypassing of the default policy of prohibiting such automatic deletion in the absence of a designation, it will be appreciated that the reverse arrangement could be implemented if desired. i.e., the default policy could allow immediate scratched data deletion if an appropriate designation was not made by the user.

As noted above, the present application is a continuation of U.S. application Ser. No. 09/121,254 filed Jul. 23, 1998, which is a continuation-in-part of U.S. application Ser. No. 09/110,217 filed Jul. 6, 1998, now U.S. Pat. No. 6,094,605, which is itself incorporated by reference in the present application. The relevant portions of that disclosure are reproduced verbatim below, with only the Figure numbers and reference numerals changed to avoid confusion with FIGS. 1–3 above and the reference numerals used therein.

BEST MODE FOR CARRYING OUT THE INVENTION

Figure 4:
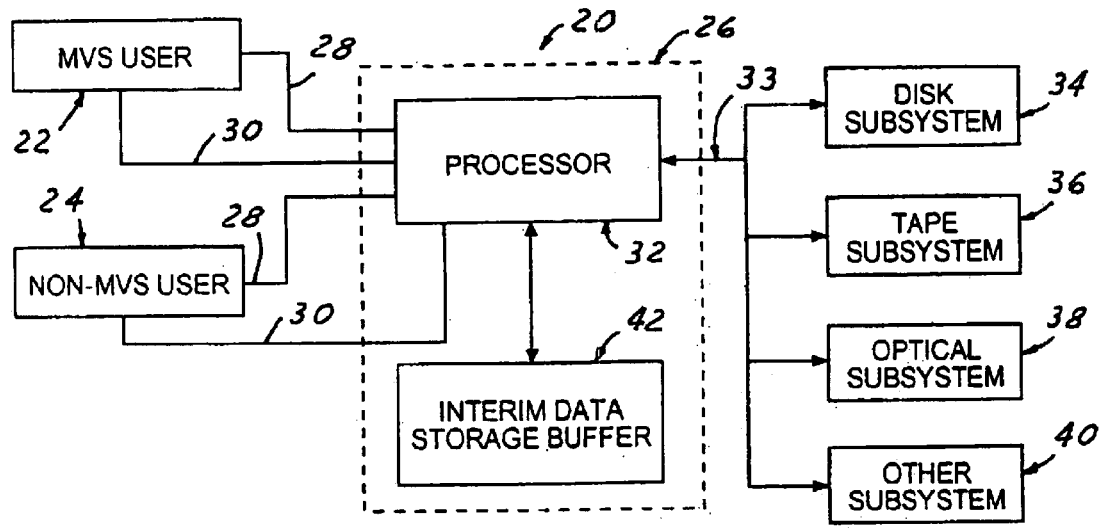
FIG. 4 is a block diagram of data storage data management system in accordance with the present invention.

Referring to FIG. 4, a data storage management system 20 is shown having a plurality of user subsystems denoted for illustrative purposes as multiple virtual storage (MVS) type systems 22 and non-MVS type systems 24, each of which are conventional and well understood to one of ordinary skill in the art, connected to a storage manager 26 via respective data lines 28 and control lines 30. Storage manager 26 includes a suitable processor 32 programmed to provide the necessary control process to implement the "virtual" data storage of the present invention, and provides an intermediary data storage control point for a plurality of physical data storage devices represented as disk subsystems 34, tape subsystems 36, optical subsystems 38, and other types of data storage subsystems 40.

As further shown in FIG. 4, storage manager 26 also includes an interim/temporary data buffer storage device 42 which is utilized by storage manager 26 as a virtual disk or tape device when access to a physical storage subsystem is requested by a user. A request for access to a physical storage subsystem may be a request for one of the subsystems 34–40 actually used in system 20, however this is not a requirement because the use of a virtual disk in lieu of an actual physical storage media in accordance with the present invention allows storage manager 26 to receive user requests for any type of storage subsystem whether connected to system 20 or not. Interim data buffer storage device 42 can be implemented as a high speed buffer arrangement, such as using solid state memory, DASD or any other suitable data storage arrangement capable of multiple, simultaneous user access.

Figure 5:
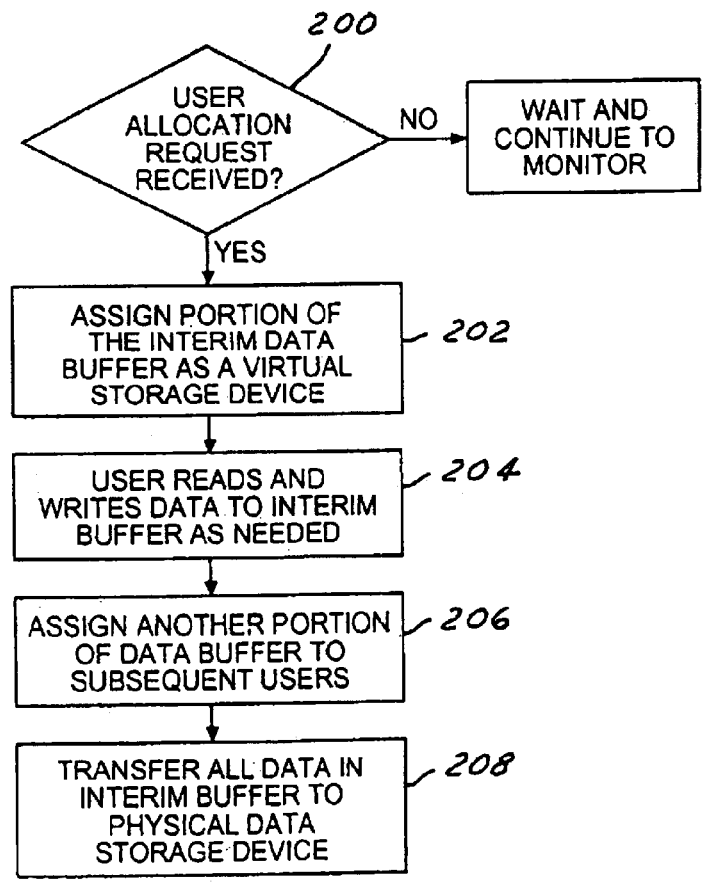
FIG. 5 is a flow chart showing 2 the virtual ACS process in accordance with the present invention.

Overall operation of the virtual data storage management process of the present invention will now be described in connection with the flow chart of FIG. 5. More specifically, as denoted by decision block 200, processor 32 determines that a request has been received from a user seeking allocation of a physical storage subsystem. In response, processor 32 initially assigns at block 202 a portion of interim data buffer 42 for allocation to the requesting user. Upon set up, the allocated user will believe an actual physical storage subsystem device has been reserved, and will proceed to read and write data as indicated by the particular application currently being executed as indicated at block 204. As denoted by block 206, multiple users are queued and assigned different portions of interim data buffer 42. The assigned portions of interim data buffer 42 are arranged in accordance with known design principles to react like or emulate operation of a compatible data storage device, such as one of the actual physical data storage devices in subsystems 34–40.

Because the buffer is designed to emulate a storage device compatible with the user request as viewed by the remote user, compatibility between the remote user and the actual type or format of physical data storage device is not required. Thus, the present invention advantageously allows any type of physical storage device to be used or added as an upgrade to an existing system. The interim buffer management arrangement would be modified to include an appropriate translation arrangement to allow data to be transferred between the buffer and the actual type of storage device employed.

As denoted at block 208, all data of the virtual volume in the interim data buffer 42 associated with the file of interest is transferred to one of the storage subsystems in such situations as the end of a user's current allocation, a filling up of memory capability in buffer 42, or periodically as part of an overall housekeeping process.

In addition, after interim data has been transferred to one of the actual physical storage subsystems, such data can be later retrieved back into the interim buffer as a virtual volume when desired by the user. After retrieval, the storage manager 26 again causes the buffer to emulate the requested type of physical storage subsystem to make the retrieved data available to the user.

With such an arrangement, the present invention advantageously provides the illusion of a compatible tape or cartridge device, while further providing significantly improved data management flexibility and efficiency in data storage device use.

While the best mode for carrying out the invention has been described in detail, those familiar with the art to which this invention relates will recognize various alternative designs and embodiments for practicing the invention as defined by the following claims.

What is claimed is:

1. A data storage management method for use with a plurality of physical data storage devices including first and second physical data storage devices of different types and a plurality of computers including first and second computers, wherein the first and second computers generate allocation requests requesting allocation of data storage space on the physical data storage devices, the method comprising:

providing an interim data storage device which acts as a virtual data storage device to the first and second physical data storage devices of different types; and providing a data storage manager in communication with the interim data storage device, the first and second computers, and the first and second physical data storage devices, the data storage manager operative to assign a first portion of the interim data storage device to the first computer for a time duration in lieu of the first physical data storage device upon receipt of an allocation request from the first computer requesting allocation of data storage space on the first physical data storage device, and to assign a second portion of the interim data storage device different than the first portion to the second computer for a time duration in lieu of the second physical data storage device upon receipt of an allocation request, during the time duration in which the first portion of the interim data storage device is assigned to the first computer, from the second computer requesting allocation of data storage space on the second physical data storage device so that the first and second computers are provided simultaneous access to the interim data storage device, and the first and second physical data storage devices are free from monopolization by the first and second computers.

2. The method of claim 1 wherein the interim data storage subsystem is operative to store data from the first and second computers in the before interim data storage space before the data is stored on the physical data storage devices.

3. The method of claim 2 wherein the data storage subsystem is further operative to transfer data stored in the interim data storage device to the physical data storage devices.

4. The method of claim 1 wherein the first portion of the interim data storage device is arranged to emulate the first physical data storage device with respect to storing and retrieving data for the first computer while being assigned to the first computer in lieu of the first physical data storage device, and the second portion of the interim data storage device is arranged to emulate the second physical data storage device with respect to storing and retrieving data for the second computer while being assigned to the second computer in lieu of the second physical data storage device.

5. The method of claim 1 wherein the interim data storage device comprises a high speed buffer memory.

6. A data storage management method for use in a data storage system comprising a plurality of physical data storage devices including first and second physical data storage devices of different types and a plurality of computers including first and second computers, wherein the first and second computers generate allocation requests requesting allocation of data storage space on the physical data storage devices, the method comprising:

providing a data storage subsystem in communication with the first and second physical data storage devices and the first and second computers, the data storage subsystem comprising interim data storage space which functions as a virtual data storage device to the first and second physical data storage devices of different types, the data storage subsystem being operative to assign a first portion of the interim data storage space to the first computer for a time duration in lieu of the first physical data storage device upon receipt of an allocation request from the first computer requesting allocation of data storage space on the first physical data storage device, and to assign a second portion of the interim data storage space different than the first portion to the second computer for a time duration in lieu of the second physical data storage device upon receipt of an allocation request, during the time duration in which the first portion of the interim data storage device is assigned to the first computer, from the second computer requesting allocation of data storage space on the second physical data storage device so that the first and second computers are provided simultaneous access to the interim data storage space, and the first and second physical data storage devices are free from monopolization by the first and second computers.

7. The method of claim 6 wherein the storage device is operative to store data from the first and second computers in the interim data stored space before the data is stored on the physical data storage devices.

8. The method of claim 2 wherein the data storage manager is further operative to transfer data stored in the interim data storage space the physical data storage devices.

9. The method of claim 6 wherein the first portion of the interim data storage device is arranged to emulate the first physical data storage device with respect to storing and retrieving data for the first computer while being assigned to the first computer in lieu of the first physical data storage device, and the second portion of the interim data storage device is arranged to emulate the second physical data storage device with respect to storing and retrieving data for the second computer while being assigned to the second computer in lieu of the second physical data storage device.

10. The method of claim 9 wherein the interim data storage device comprises a high speed buffer memory.

* * * * *